Oct. 3, 1961 R. S. GRESKO 3,002,767
CONTROL SYSTEM FOR FIFTH WHEELS
Filed Feb. 26, 1960
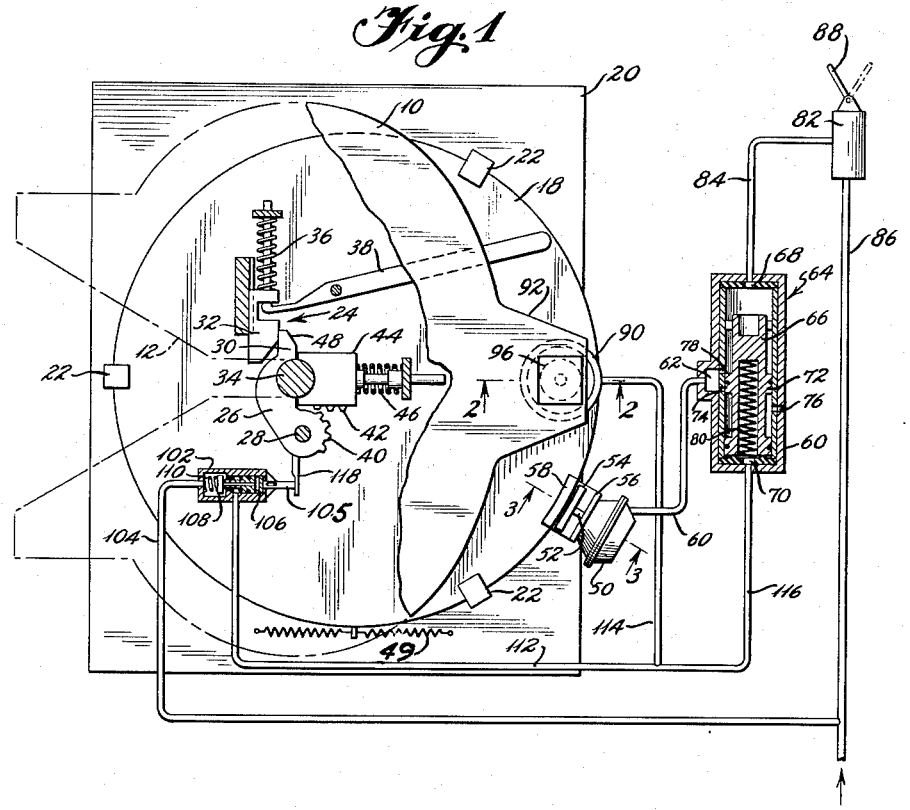
INVENTOR
*Raymond S. Gresko*
BY *Scrivener & Parker*
ATTORNEYS

3,002,767
CONTROL SYSTEM FOR FIFTH WHEELS
Raymond S. Gresko, Elyria, Ohio, assignor to Bendix-Westinghouse Automotive Air Brake Company, Elyria, Ohio, a corporation of Delaware
Filed Feb. 26, 1960, Ser. No. 11,260
5 Claims. (Cl. 280—434)

This invention relates to automotive tractor trailer coupling mechanism and, more particularly, to a fluid pressure control system for use in connection with a fifth wheel coupling.

It is a broad object of the present invention to provide a system for releasably locking a tractor carried, swivel-type, fifth wheel in alignment with the fore and aft axis of the tractor during a coupling operation.

It is another object of the invention to provide a system of the foregoing nature wherein the locking means is automatically released upon completion of the coupling operation.

Still another object of the invention is to provide manually controlled means for operating the locking means and means for insuring operation of the unlocking means in the event the operator neglects to manually release the locking means.

Still another object of the invention is to provide means for releasably locking the trailer to a swivel-type fifth wheel to insure that when there is articulate movement between the tractor and trailer the trailer does not pivot about its kingpin but rather the entire fifth wheel swivels about its pivot, thereby decreasing wear on the kingpin and the kingpin latch means.

Yet another object of the invention is to provide means for automatically releasing the last named locking means when the trailer is to be uncoupled.

Other objects and their attendant advantages will become apparent as the following detailed description is read in conjunction with the accompanying drawings wherein:

FIG. 1 is a top plan view, partly phantom and partly schematic of the system of the invention as employed with a tractor trailer fifth wheel coupling mechanism;

FIG. 2 is a cross sectional view, partly in elevation, taken substantially on the line 2—2 of FIG. 1; and FIG. 3 is a view taken substantially on the line 3—3 of FIG. 1.

Referring now to the drawings, and particularly FIG. 1, a fifth wheel 10 having the usual diverging slot 12, is shown rockingly mounted on trunnions 14 (FIG. 2) which are fixed by conventional brackets 16 to a lower fifth wheel plate 18 which is swivel-mounted atop a tractor bed plate 20 by means of brackets 22 which are radially spaced about the periphery of the plate 18 and are fixed to the bed plate 20 as shown.

The kingpin latch mechanism broadly indicated by the numeral 24 comprises a latch arm 26 which is pivoted to the plate 18 at 28 and is provided with a latch 30 whose rear edge is engaged by a keeper 32 which locks the latch behind the trailer kingpin 34, as shown, when the latter is coupled to the fifth wheel. The keeper 32 is urged by a spring 36 into locking position and is moved manually out of locking position by means of a manually operable lever 38 which may be moved clockwise in FIG. 1 to cause the keeper to move outwardly clear of the latch 30 when the trailer is to be uncoupled.

To insure that the latch arm 26 is fully open and clear of the slot 12 before coupling and that after coupling the latch arm is in the fully locked position of the drawing, the arm 26 is provided with a plurality of radial gear teeth 40 which are engageable by a plurality of rack gear teeth 42 integral with a slidable block which is urged rearwardly by a spring 46. Thus when the kingpin 34 is to be withdrawn from the slot 12, the spring 46 causes the block 44 to follow the kingpin rearwardly and as the block moves, the teeth 42 thereof engage the teeth 40 of the latch arm and positively swing the latter counter clockwise in FIG. 1 clear of the slot 12 where the arm remains until a kingpin again enters the slot whereupon the block, which extends rearwardly beyond the forward edge of the slot, is engaged by the kingpin and is moved forwardly causing the latch arm to be positively swung clockwise behind the kingpin, a cam surface 48 on the forward edge of the latch 30 engaging the keeper 32 to cam this outwardly until the latch is in locking position whereupon the spring 36 moves the keeper behind the latch so that the latch arm is again locked in the coupled position of the drawing. The swivel-type fifth wheel described may be centered for coupling by means of springs such as those indicated at 49 which extend forwardly and rearwardly from a point on the periphery of the lower plate 18 to points of attachment on the tractor bed plate 20.

It is well known in the art that in the process of coupling a trailer to a swivel-type fifth wheel, the tractor must be carefully aligned with the kingpin and then backed so that the kingpin enters the slot exactly without striking the sides thereof and causing the fifth wheel to turn prematurely so that the kingpin cannot fully enter the slot. To avoid this, the present invention provides means for locking the fifth wheel against swivelling during the coupling process with means being provided for either manually or automatically unlocking the locking means after the kingpin has been fully coupled. Additionally, the present invention provides automatic means which cooperates with the automatic locking feature just mentioned whereby after the trailer is coupled, the bolster plate thereof is locked to the fifth wheel so that whenever there is relative articulated turning movement between the tractor and trailer, as when the tractor is negotiating a turn, the entire fifth wheel assembly is rotated as if it were connected integrally with the trailer. Thus there can be no relative rotation between the kingpin and the latch arm, eliminating excessive wear of these members which would occur if the fifth wheel assembly were unable to or failed to turn or swivel as intended.

The means for locking the fifth wheel assembly against swivelling during coupling comprises a fluid motor 50 which may be in all respects be substantially similar to a conventional brake chamber and is provided with an actuating rod 52 carrying a brakeshoe member 54 which may be moved against the force of a release spring (not shown) within the chamber 50 in response to fluid pressure delivered against the opposite side of a diaphragm (not shown) in the chamber. As illustrated in FIG. 3, the chamber is fixed to a bracket 56 rigidly connected to the tractor bed plate 20, and the lower swivel plate 18 of the fifth wheel assembly may have affixed thereto a vertical plate 58 against which, when the plate 18 is properly aligned, the brakeshoe 54 is moved when fluid pressure is admitted to the chamber 50.

Fluid pressure is admitted to the chamber 50 through a conduit 60 connected to a port 62 of a conventional shuttle valve 64 which includes a casing containing a piston member 66 movable in opposite directions in the casing in response to fluid pressure admitted to either one or the other of oppositely disposed inlet ports 68, 70. The piston 66 is shown in the position it takes when pressure is admitted to the upper port 68 and in this position a land 72 on the piston closes off a connection between port 62 and atmosphere by way of ports 74, 76 and connects port 62 to port 68 by way of port 78 so that the same pressure which retains piston 66 in the position shown against the upward force of a spring 80 is also delivered to the brake chamber 50 to move the brakeshoe 54 against the plate 58. When pressure is relieved from the upper side of piston 66 the spring 80 shifts the piston to its upper position whereby the land 72 closes port 78 and connects the port 62 to atmosphere thereby releasing the pressure in the chamber 50. In the event the same pressure is simultaneously applied to both the upper and lower ports 68, 70 the pressures on the piston 66 are balanced and the spring 80 causes the piston to move to or be retained in its upper position as will be apparent to those skilled in the art.

Pressure is admitted to or exhausted from the other side of the piston 66 under the control of the operator by way of a conventional two-way valve 82 which is connected to port 68 by a conduit 84 and to a source of fluid pressure (not shown), which may be the main reservoir serving the fluid pressure braking system of the vehicle, by way of a conduit 86. In the solid line position of the lever 88, by means of which the valve 82 is manually controlled, the conduit 86 is connected to the conduit 84 to effect setting of the brakeshoe 54. When the lever 88 is moved to the dotted line position, conduit 86 is disconnected from conduit 84 and the latter is connected to atmosphere thereby enabling the piston to shift to its upper position and connect the brake chamber to atmosphere to release the brakeshoe.

The second feature of the invention, above mentioned, concerns means for locking the fifth wheel 10 to the bolster plate of the trailer to insure swivelling of the entire fifth wheel assembly to eliminate excessive wear on the kingpin. This is accomplished by means of a second brake chamber 90 which is fixed to the underside of a forward extension 92 integral with the fifth wheel 10. The extension 92 contains an opening 94 for receiving the brakeshoe 96 which is extended upwardly through the opening into tight frictional engagement with the bolster plate 98 of a trailer 100, as indicated in FIG. 2, whenever fluid pressure is admitted to the brake chamber 90.

The flow of fluid pressure to and from the chamber 90 is controlled by a conventional two-way valve 102 having an inlet which is supplied with fluid pressure by way of a branch conduit 104 connected to the aforementioned conduit 86. The valve 102 is provided with a plunger 105 which when moved inwardly causes an exhaust passage 106 in the plunger to be closed off by engagement thereof with an inlet valve 108 which upon continued movement of the plunger is unseated against the force of a spring 110 to connect the pressure conduit 104 to a conduit 112 which leads by way of conduits 114, 116 to the brake chamber 90 and the port 70 of the shuttle valve respectively. When the plunger 105 moves in the opposite direction, the valve 108 is seated to cut off the supply of pressure to conduit 112 and the latter is connected to atmosphere by way of the exhaust passage 106 in the plunger.

Movement of the plunger 105 is controlled automatically by means of an arm 118 which is integrally attached to the latch arm 26 and when this member is in the locked position of the drawing the arm 118 engages the plunger 105 to move it inwardly so that the valve 102 simultaneously delivers pressure to the bolster locking brake chamber 90 and to the lower port 70 of the shuttle valve causing this to move upwardly and exhaust the brake chamber 50 regardless of the position of the lever 88 of the valve 82.

When the latch arm 26 is moved to unlatching position, the arm 118 is moved away from the plunger 105 permitting the inlet valve 108 of valve 102 to close and connect the brake chamber 90 and the port 70 of the shuttle valve 60 to atmosphere.

In operation, if it is assumed initially that the latch arm 26 is in unlatched position and the lever 88 of valve 82 is in the dotted line position, no pressure is delivered to either brake chamber and the spring 118 centers the plate 18 with the plate 20. When the operator desires to connect to a trailer, he moves lever 88 to the full line position thereby admitting pressure to brake chamber 50 as above explained to lock the fifth wheel assembly against swivelling. The operator then backs the tractor so that the kingpin is engaged in the groove 12 and should there be any slight misalignment, the trailer is shifted slightly bodily by the camming action of the groove on the kingpin. After the kingpin has been fully received in the forward end of the groove and the latch arm 26 is moved to locked position, the valve 102 is opened by the arm 118 to admit pressure to the bolster locking brake chamber 90 and also to the port 70 of the shuttle valve 64 to cause piston 66 thereof to move to its upper position thereby exhausting brake chamber 50 even though the operator may have neglected to move the lever 88 from the position connecting conduits 84, 86 to the disconnect position whereby the brake chamber 50 is connected to atmosphere.

When the operator desires to uncouple the trailer from the tractor, he moves the locking lever 38 clockwise to release the latch 30 and permit the latch arm 26 to be swung sufficiently far in an opening direction that arm 118 is moved clear of plunger 105 of valve 102 so that the latter operates to exhaust pressure from the bolster plate brake chamber 90 to cause brakeshoe 96 to be withdrawn into the opening 94 entirely clear of the trailer. The operator also moves the lever 88 to the dotted line uncoupling position to connect the brake chamber 50 to atmosphere so that the fifth wheel assembly is free to swivel during the uncoupling movement of the tractor.

From the foregoing, it will be understood that the system of the present invention insures at all times that when the fifth wheel is coupled, th entire fifth wheel assembly will positively swivel relative to the bed plate of the tractor. Further, the invention provides means for positively locking the fifth wheel assembly against swivelling during a coupling operation with additional means being provided for deactivating the last named means when the trailer is completely coupled to the fifth wheel. It will be apparent to those skilled in the art that the system of the invention is susceptible of a variety of modifications and changes without, however, departing from the scope and spirit of the appended claims.

What is claimed is:

1. In combination with a fifth wheel assembly of the type having a fifth wheel rockingly mounted on a lower fifth wheel plate connected for swivelling relative to a tractor bed plate, and including latch means carried between said fifth wheel and said plate and movable to latching position behind a kingpin of a trailer when said pin is received in the slot of said fifth wheel, means for releasably locking said latch means in latching position, and means responsive to relative movement between said kingpin and said fifth wheel for automatically moving said latch means between latched and unlatched position upon release of said locking means, fluid pressure brake means including a brake chamber engageable with said assembly to prevent rotation thereof during coupling, second fluid pressure brake means including a second brake chamber carried by said assembly and engageable with the bolster plate of a trailer to lock said trailer to said assembly after coupling, a control system for said brake chambers for connecting and disconnecting said chambers with a source of fluid pressure during coupling and uncoupling operations, said system comprising conduit means affording a connection between said source and said second brake chamber, normally closed valve means in said conduit means movable to open position in response to movement of said latch means to latching position so as to connect said brake chamber and said source to lock said bolster plate to said assembly, said valve means being movable in response to movement of said latch means to unlatching position to disconnect said source and said chamber while simultaneously connecting the latter to atmosphere, a fluid conduit connecting said other brake chamber to said source, a manually operable valve in said conduit movable between a position connecting said source and said chamber and a position disconnecting said source and said chamber while connecting the latter to atmosphere, a shuttle valve between said chamber and said last named valve, said shuttle valve including a double-acting pressure responsive member exposed on opposite sides to the pressure delivered to said first brake chamber and the pressure in the conduit between the manually operable valve and said second brake chamber, said pressure responsive member being resiliently urged in the same direction as the pressure acting thereon from said first brake chamber, said pressure responsive member when exposed only to the pressure delivered by said manually operable valve occupying a position connecting said manually operable valve and said brake chamber and when exposed to the pressure delivered to said first brake chamber upon movement of said latch means to latching position occupying a position connecting said second brake chamber with atmosphere while simultaneously disconnecting said chamber from said manually operable valve.

2. In combination with a fifth wheel assembly of the type having a fifth wheel mounted for swivelling on the bed plate of a tractor, said fifth wheel having a slot for receiving a trailer kingpin and having latch means movable into locking engagement with said kingpin when the latter is in coupling position, means for locking the fifth wheel and trailer bolster plate comprising a fluid brake chamber secured beneath said fifth wheel, an opening in said fifth wheel registering with said brake chamber, a brakeshoe operatively connected to said brake chamber and movable between a released position wherein said shoe is entirely received within said opening and an applied position wherein said brake shoe extends above said fifth wheel, a fluid conduit affording a connection between a source of fluid pressure and said brake chamber, valve means in said conduit normally disconnecting said source and said brake chamber while simultaneously connecting the latter to atmosphere, and means responsive to movement of said latch means to coupling position for operating said valve means to disconnect said brake chamber from atmosphere while simultaneously connecting said chamber to said source of fluid pressure.

3. The combination of claim 2 including means for locking said assembly against swivelling during coupling comprising a second brake chamber secured to the bed plate, a brakeshoe opeatively connected to said chamber and movable into and out of locking engagement with said fifth wheel assembly, fluid conduit means affording a connection between said source and said second brake chamber, manually controlled valve means in said conduit for selectively connecting and disconnecting said second brake chamber and said source, a shuttle valve in said fluid conduit means between said manually controlled valve means and said second chamber, said shuttle valve normally connecting said second brake chamber to atmosphere and operable in response to operation of said manually controlled valve means to its connecting position for disconnecting said second brake chamber from atmosphere while simultaneously connecting said second chamber with said manually controlled valve means, and a fluid connection between said first brake chamber and said shuttle valve, said shuttle valve being operable in response to fluid pressure delivered to said first brake chamber for positively connecting said second brake chamber to atmosphere while disconnecting said chamber from said manually controlled valve means.

4. In combination with a fifth wheel assembly of the type having a fifth wheel rockingly mounted on a lower fifth wheel plate connected for swivelling relative to a tractor bed plate, and including latch means carried between said fifth wheel and said plate and movable to latching position behind a kingpin of a trailer when said pin is received in the slot of said fifth wheel, means for releasably locking said latch means in latching position, and means responsive to relative movement between said kingpin and said fifth wheel for automatically moving said latch means between latched and unlatched position upon release of said locking means, first fluid pressure brake means engageable with said assembly to prevent rotation thereof during coupling, second fluid pressure brake means carried by said assembly and engageable with the bolster plate of a trailer to lock said trailer to said assembly after coupling, means including a first valve for supplying fluid pressure to said first brake means, means including a second valve for supplying fluid pressure to said second brake means and for exhausting said first brake means, and means operable by movement of said latch means to operate said second valve.

5. In combination with a fifth wheel assembly of the type having a fifth wheel rockingly mounted on a lower fifth wheel plate connected for swivelling relative to a tractor bed plate, and including latch means carried between said fifth wheel and said plate and movable to latching position behind a kingpin of a trailer when said pin is received in the slot of said fifth wheel, means for releasably locking said latch means in latching position, and means responsive to relative movement between said kingpin and said fifth wheel for automatically moving said latch means between latched and unlatched position upon release of said locking means, first fluid pressure brake means engageable with said assembly to prevent rotation thereof during coupling, second fluid pressure brake means carried by said assembly and engageable with the bolster plate of a trailer to lock said trailer to said assembly after coupling, a control system for said brake means for connecting and disconnecting said brake means with a source of fluid pressure during coupling and uncoupling operations, said system comprising conduit means affording a connection between said source and said second brake means, normally closed valve means in said conduit means movable to open position in response to movement of said latch means to latching position so as to connect said second brake means and said source to lock said bolster plate to said assembly, said valve means being movable in response to movement of said latch means to unlatching position to disconnect said source and said second brake means while simultaneously connecting the latter to atmosphere, a fluid conduit connecting said first brake means to said source, a manually operable valve in said conduit movable between a position connecting said source and said first brake means and a position disconnecting said source and said first brake means while connecting the latter to atmosphere, and means responsive to the pressure delivered to said first brake means upon movement of said latch means to latching position for connecting said second brake means with atmosphere while simultaneously disconnecting said second brake means from said manually operable valve.

References Cited in the file of this patent

UNITED STATES PATENTS

| | | |
|---|---|---|
| 2,188,727 | Soulis | Jan. 30, 1940 |
| 2,667,364 | Colpo | Jan. 26, 1954 |